Jan. 8, 1935.   G. A. BIGGS   1,986,915
HYDRAULIC TURBINE
Filed March 23, 1933   3 Sheets-Sheet 1

INVENTOR
GEORGE A. BIGGS.
BY
Toulmin & Toulmin
ATTORNEYS

Jan. 8, 1935.  G. A. BIGGS  1,986,915
HYDRAULIC TURBINE
Filed March 23, 1933    3 Sheets-Sheet 2
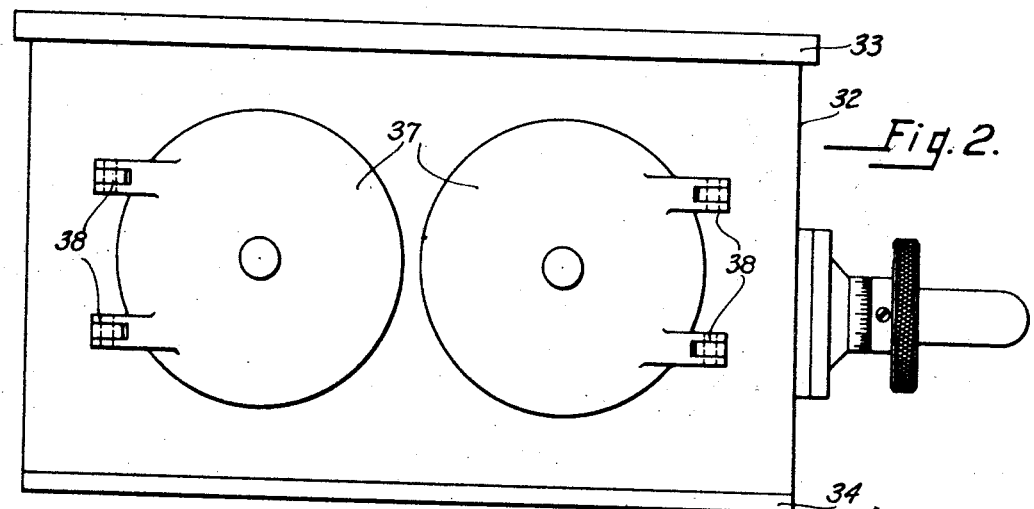
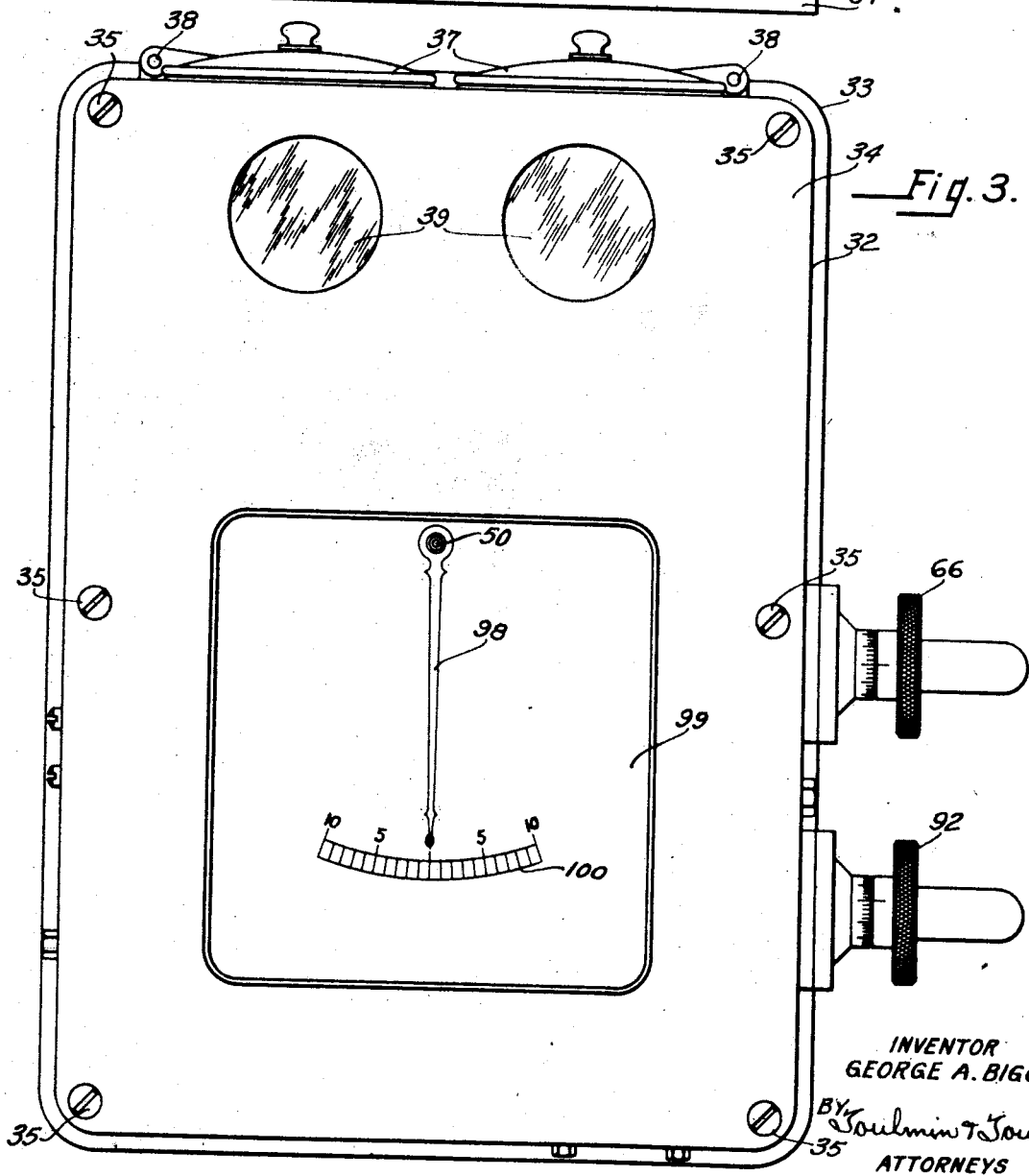
INVENTOR
GEORGE A. BIGGS.
BY Toulmin & Toulmin
ATTORNEYS Jan. 8, 1935.   G. A. BIGGS   1,986,915

HYDRAULIC TURBINE.

Filed March 28, 1933   3 Sheets-Sheet 3

INVENTOR
GEORGE A. BIGGS.

BY Toulmin & Toulmin
ATTORNEYS

Patented Jan. 8, 1935

1,986,915

UNITED STATES PATENT OFFICE 1,986,915

HYDRAULIC TURBINE

George A. Biggs, Springfield, Ohio, assignor to The James Leffel and Company, Springfield, Ohio, a corporation of Ohio Application March 28, 1933, Serial No. 663,184

17 Claims. (Cl. 253—122)

This invention relates to improvements in turbines and has for its object to provide means for automatically controlling the speed of the turbine, and means for regulating the speed controlling means.

It is an object of this invention to provide, in connection with a hydraulic turbine, means for opening and closing the blades of the turbine whereby the quantity of water passing through the turbine is regulated, and electrically operated means for operating the means for opening and closing the blades.

It is also an object of this invention to provide electrically operated means for opening and closing the blades of a hydraulic turbine, and photoelectric cells for closing a circuit for the purpose of operating the electrically operated means.

It is a further object of this invention to provide, in connection with gates for controlling the water to a hydraulic turbine, photo-electric means for regulating the positions of the blades, and means connected to the photo-electric cells for causing the cells to act under different speed conditions in the turbine.

It is a further object of the invention to provide, in connection with photo electrically operated means for regulating the positions of the blades in a hydraulic turbine, means for stabilizing the action of the blades and means to prevent racing of the turbine.

These and other advantages will appear from the following description taken in connection with the drawings.

Referring to the drawings:

Figure 2 is a top plan view of a casing in which there is housed mechanism for causing the automatic control of the turbine blades.

Figure 3 is a front elevation of the casing shown in Figure 2.

Figure 1:
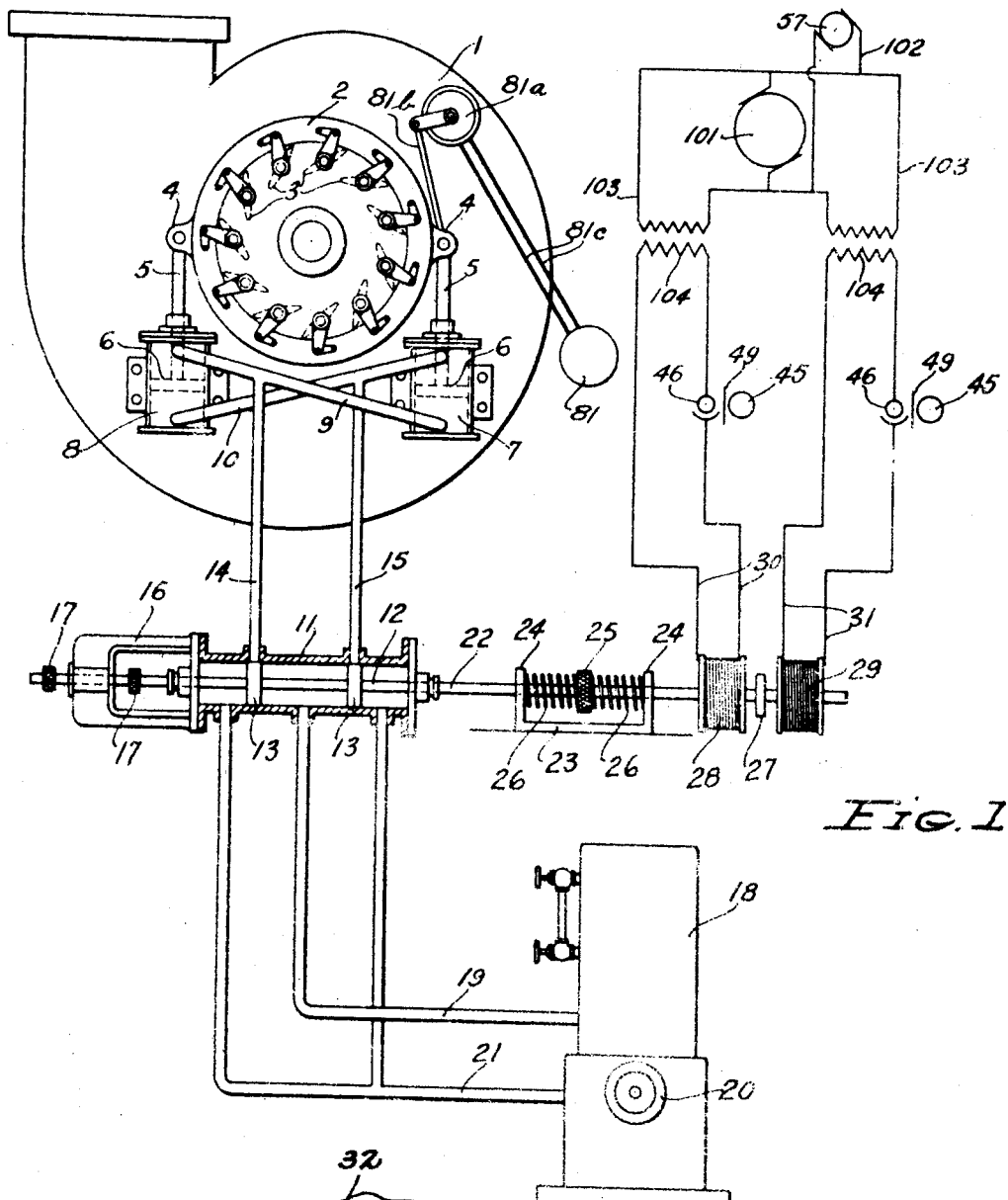
Figure 1 is a diagrammatic view showing the turbine, motors for shifting the blades of the turbine, fluid pressure means for operating the motors, and electrically operated means for controlling the application of fluid pressure to the motors.
Figure 6:
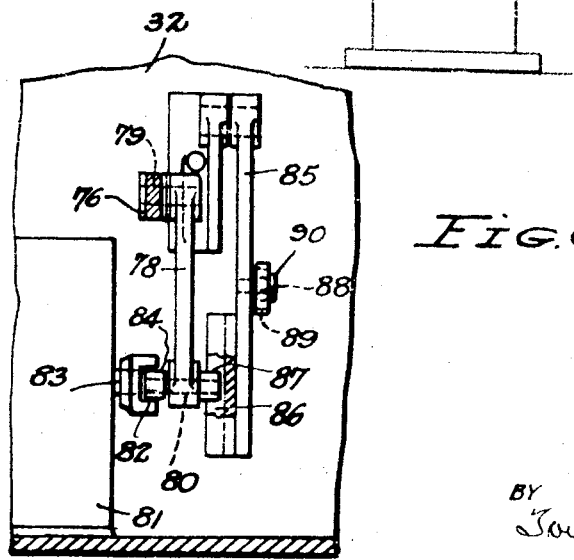
Figure 6 is a section on the line 6—6 of Figure 4.

In Figure 1 there is shown a turbine 1, which is used for operating a generator. This turbine has the usual draft tube, runner shaft, buckets and gates. The shaft and buckets are not shown.

The gates are indicated by the numeral 3 and are operated by a gate ring 2. By rotating the ring the gates may be adjusted from a closed to an open position or from an open to a closed position. The runner shaft is used for operating a generator, in which the turbine shaft may be continuous with the generator shaft.

On the gate ring are ears 4, to each of which one end of a piston rod 5 is attached. On the other end of each piston rod is a piston 6. One of these pistons works in a motor cylinder 7, while the other works in a motor cylinder 8. These cylinders operate on opposite sides of the gate ring and operate in opposite directions for rotating the gate ring to shift the position of each gate. The front end of cylinder 8 is connected to the rear end of cylinder 7 by means of a pipe 9, while the front end of cylinder 7 is connected to the rear end of the cylinder 8 by a pipe 10.

The numeral 11 is used to designate a valve cylinder, closed at each end except for openings to provide bearings for the valve stem 12, which extends longitudinally through the valve cylinder. On this valve stem are fixed two valve members 13. The valve cylinder is connected adjacent one end to the pipe 9 by means of a pipe 14, and is connected adjacent the other end to the pipe 10 by means of a pipe 15. The valve members 13 under normal conditions close the cylinder ends of the pipes 14 and 15, as is clearly shown in Figure 1, so that no fluid under pressure can pass from the valve cylinder, through the pipes 14 and 15 and into the cylinders 7 and 8.

On one end of the valve cylinder is a yoke 16 through which one end of the valve stem passes. The valve stem has on it, on opposite sides of the yoke, nuts 17 for limiting the longitudinal movement of the valve stem and the movements of the valve members on the stem with relation to the pipes leading from the valve cylinder. For the purpose of providing a source of fluid under pressure there is provided a pressure tank 18, which has leading therefrom to the valve cylinder a pressure pipe 19. This pipe enters the valve cylinder between the points where the pipes 14 and 15 enter the cylinder, and between the valve members 13 so that the pressure fluid is admitted into the valve cylinder at all times between the two valve members on the valve stem.

For the purpose of providing fluid under pressure to the pressure tank there is a pump 20, which has a return pipe 21. This return pipe has two branches as it leaves the valve cylinder, one at each end and between the end of the valve cylinder and the point where the valve members normally rest, as shown in Figure 1.

On the end of the valve cylinder opposite the yoke 16 the valve stem has an extension 22, which is supported by means of a yoke 23, suitably supported for that purpose. This yoke has two upwardly extending legs 24 through which the extension passes. On the extension 22, between the legs 24, is a nut 25 which may be adjusted longitudinally of the extension by rotation.

Between this nut 25 and each leg 24 is a spring 26. These springs operating on the nut 25 tend to normally hold the valve stem in such a position that the valve members 13 will close the ends of the pipes 14 and 15 and prevent fluid under pressure passing through the pipes 14 and 15 into the motor cylinders 7 and 8. On the end of the extension beyond the yoke 23 is a core 27.

On one side of the core 27 and around the extension is an electro magnet formed by coils 28. On the extension 22, on the side of the core opposite the magnetic coil 28, is a second magnetic coil 29. These coils are energized for the purpose of moving the valve stem longitudinally. Energizing the coil 28 causes the core 27 to be attracted and the valve members are moved toward the lefthand. If the coil 29 is energized the core 27 is attracted to it and the valve members moved in a righthand direction. These reverse movements of the valve members cause a reverse action in the motor cylinders 7 and 8.

The electrical circuit to the coil 28 is indicated by the numeral 30, while the numeral 31 indicates the electrical circuit to the coil 29. Each of these circuits is connected to a source of electrical energy, and has in it a relay operated by means of a photo-electric cell housed within a casing 32. This casing is composed of two parts, the main part consisting of bottom, top, side walls and back wall 33, with certain partitions therein, and a front plate 34 fastened by means of screws 35 to the other part of the casing.

The top of the casing has two openings 36 therein, each of which is closed by a closure 37 supported by means of hinges 38. In the front plate are two panels 39. The upper part of the casing is divided by partitions into four chambers. The numeral 40 indicates a horizontal partition; 41 a vertical longitudinal partition and 42 a vertical transverse partition. Each of two of the chambers is indicated by the numeral 43 and has therein a photo-electric cell 46. Each of the other two chambers is indicated by the numeral 44 and has therein an incandescent light 45. Each photo-electric cell is separated from an incandescent light by the partition 41, which has a slot therein, later to be described.

In the bottom partition 40 and in the partition 42 are slots 47, in which a shield plate 49 is located and moves. This shield plate is more or less V-shaped and is supported on a bracket 48 extending beneath the partition 40. For supporting the shield plate in the bracket 48 the lower corner of the shield plate is provided with a shaft 50, to which it is rigidly attached.

This shaft rotates in a bearing in the bracket 48, and has thereon, in addition to the shield plate, a sector 51 which moves with the rotation of the shaft. This sector 51 has on its periphery teeth 52, which engage teeth 53 on the upper end of an arm 54. This arm 54 has extending from its lower end a horizontally disposed arm 55. The arms 54 and 55 form together a bellcrank lever, which is mounted at its turn on an armature shaft 56 which carries an armature 57 adapted to rotate or rock between two poles 58 supported by a pole ring 59 suitably supported in the casing. The shaft 56 is likewise suitably supported in the casing.

Attached to one side of the casing is a bracket 60, which has horizontally extending spaced arms 61. In each arm is an adjusting screw 62. The free end of the arm 55 moves between the adjusting screws 62 and is limited in its movement by means of these adjusting screws. To the arm 54 one end of a spring 63 is attached, while the other end of this spring is attached to an adjusting shaft or screw 64 which projects through one side of the casing and has thereon an adjusting nut 65 operated or rotated by means of a knob 66. This spring prevents a too free movement of the arm 54 and the armature 57.

When a current is passing about the poles 58 it tends to rotate the armature in anti-clockwise direction. The stronger the voltage of the current the greater the tendency of the armature to thus rotate. This tendency of the armature to rotate is resisted by means of the spring 63, and the amount of this resistance may be adjusted by rotating the knob 66.

To one side of the casing adjacent the bottom is a suporting bracket 67, which has therein a dashpot 68. In this dashpot is a piston 69, which has extending therefrom a piston rod 70. On the upper end of this piston rod is a yoke 71 by which the piston rod is attached to the arm 55. Between the yoke 71 and the top of the dashpot is a spring 72.

The dashpot is supported on one end of a lever 73, which is pivoted intermediate its ends on a link 74, suitably attached to the bottom of the casing. To the other end of the lever 73 is attached one end of a link 75, which has its other end attached to one end of a lever 76. The other end of this lever 76 is pivoted at 77 to one side of the casing. 78 is a connecting link pivoted at one end to the lever 76 at the point 79. On the other end of this link is an axle 80, which has one each side of the link a roller, one 84 and the other 87.

The numeral 81 designates a selsyn motor, which is controlled by the motion of the gate mechanism. The gate mechanism gives to this motor a partial turn when the gates move. On this motor is a slotted lever 82 attached at one end to the motor shaft 83. In this slotted lever 82 the above mentioned roller 84 fits and moves. Pivoted at its upper end to a bracket on the casing is a lever 85, which has in its lower end a slot 86 in which the other roller 87 fits and moves.

In one side of the casing below the adjusting shaft or screw 64 is an adjusting shaft or screw 88, which has in its inner end a slot 89 in which a roller 90 works. This roller is attached in some suitable manner to the lever 85 intermediate its ends. The screw 88 is adjusted by means of a nut 91, operated by a knob 92. The adjustment of this screw or shaft positions the rollers on the lower end of the lever 85 so that the movement of the selsyn motor will be regulated to control the amount of the swinging of the lever 76 and the lever 73.

Figure 4:
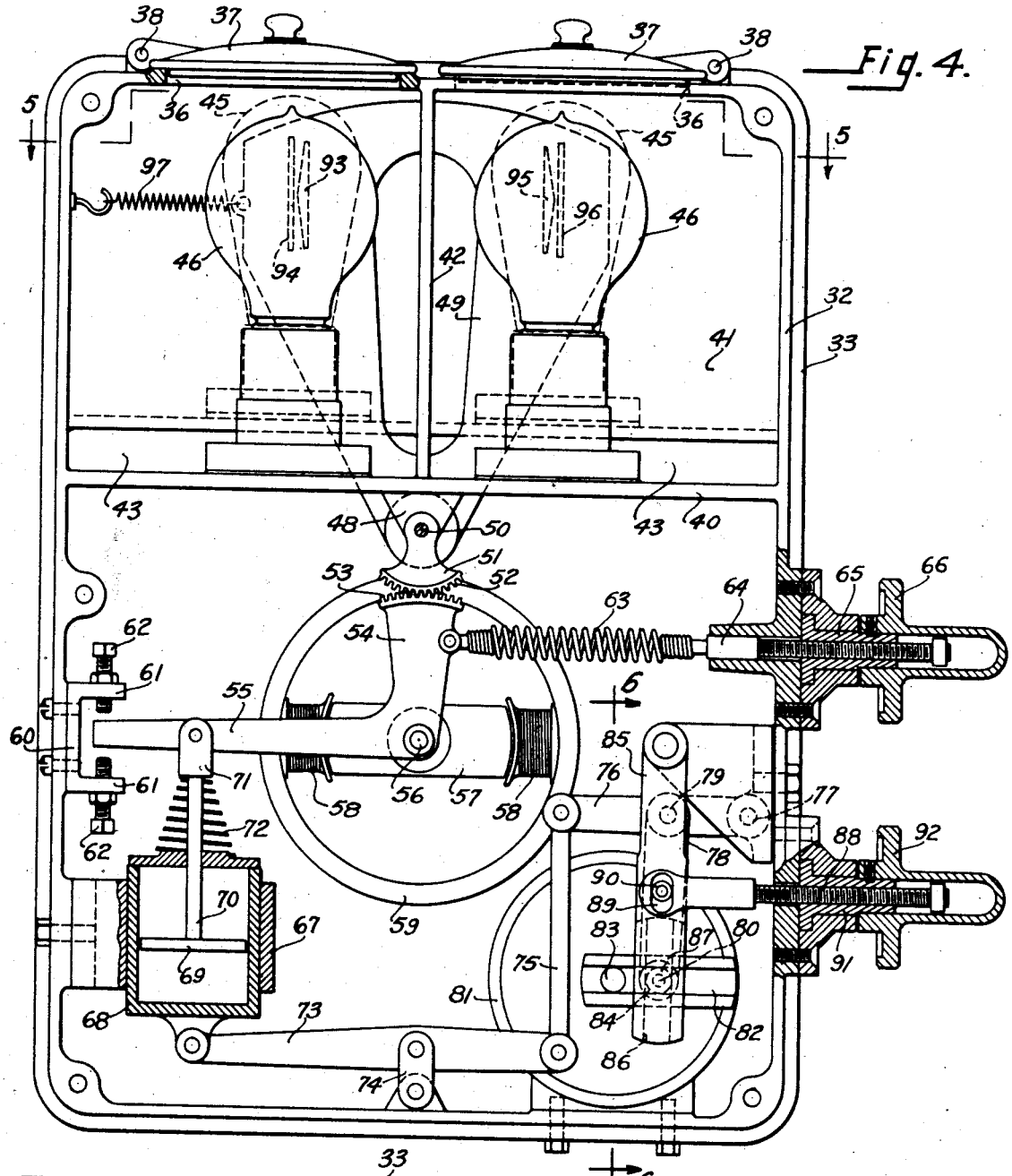
Figure 4 shows the casing with the front plate removed and one wall partly in section.
Figure 5:
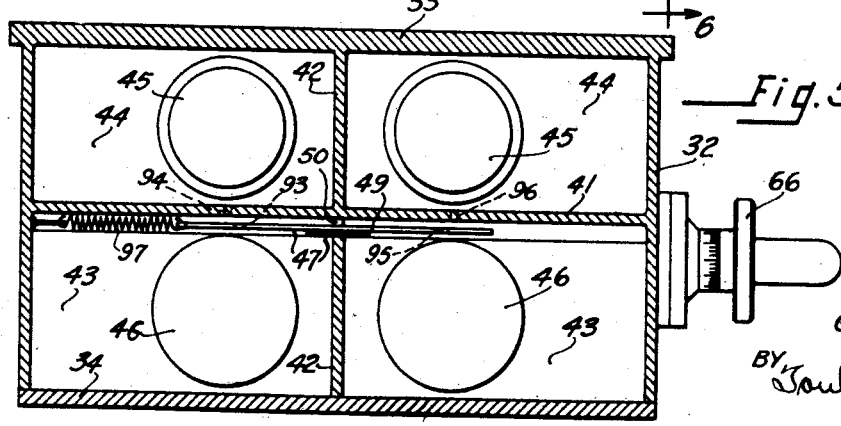
Figure 5 is a section on the line 5—5 of Figure 4.

In the shield plate is a slot 93 which is adapted to align with a slot 94 in the partition 41. These slots are between the chambers 43 and 44 at one side of the casing. In addition to the slot 93 the shield plate has a slot 95 therein adapted to align with a slot 96 in the partition 41. As shown in Figure 4 the slots 93 and 94, and 95 and 96 are out of alignment. A spring 97 is attached at one end to the wall of the casing, and its other end is attached to one edge of the shield plate for the purpose of preventing vibration and irregular action in the plate.

In the lower part of the front plate 34 is a glass panel 99, through which a pointer 98, attached to the shaft 50, may be seen. This pointer moves over a scale 100 and indicates the speed of the turbine. When the pointer is on the lefthand side of the zero point the turbine is running at "over" speed, whereas if the pointer is on the righthand side of the zero point the turbine is running at "under" speed.

The amount of the voltage in the coils of the poles 58 determines the position of the arms 54 and 55. If the voltage is small the various mechanisms tend to hold the parts in the position shown in Figure 1. If the voltage becomes too low the spring 63 tends to elevate the end of the lever or arm 55, which is limited in its movement by the upper screw 62.

If the voltage should become too low the clockwise movement of the arm 54 will cause an anti-clockwise movement of the shield plate. This anti-clockwise movement of the shield plate will cause the slots 93 and 94 to come into alignment so that a ray of light will pass from the incandescent lamp to the photo-electric cell. This light impinging on the photo-electric cell produces therein an emission of electrons. These electrons form passageways through the photo-electric cells so that a circuit is completed through the circuits 30 and 31. In Figure 1 there is shown schematically a wiring diagram for energizing the coils 28 and 29. The generator, which is shown diagrammatically in this figure, is indicated by the numeral 101 and is operated by the turbine shaft.

Connected to the generator are primaries 103 of transformers, which have secondaries 104 connected in the circuits 30 and 31. Instead of the circuits 30 and 31 being connected to the generator by means of transformers, batteries may be used to energize these circuits for operating the valves on the valve stem 22. In this figure the lights 45 and the photo-electric cells 46 are shown diagrammatically. 49 represents the plates for controlling the admission of light to the photo-electric cells.

There is also connected to the motor circuit, of which the primaries of the transformers are parts, a circuit 102, which leads to the poles 58 for operating the armature 57. The generator is operated by the turbine.

If an unduly high voltage is generated by the generator the armature rocks to shift the plate 49. The shifting of this plate will cause light from the light bulbs to impinge upon the photo-electric cell so that a current will pass through the circuit in which this cell is located. This circuit will energize one of the coils, either 28 or 29, to shift the valve members 13. Through the shifting of the valve members 13 the motors operate to shift the valves.

In the event the motor is running too fast, the gates will be shifted to cut off part of the water, thereby reducing the speed of rotation of the generator shaft. In the event that the voltage drops light will be caused to impinge upon one of the photo-electric cells, energizing the other coil so that the valves are operated to actuate the motors to open the gates, thereby again increasing the rotation of the generator shaft and increasing the voltage output of the generator. These operations are automatic so that a substantially uniform speed of rotation for the generator shaft will be maintained.

When the gate ring moves it operates through the link 81b the member 81a, which is connected to the selsyn motor or member 81 by conductors 81c. Any movement of the ring 2 will cause a partial rotation of the member 81 and a shifting of the slotted lever 82.

It will be understood that I desire to comprehend within my invention such modifications as come within the scope of my claims and my invention.

Having thus fully described my invention, what I claim as new and desire to secure by Letters Patent, is:

1. In a hydraulic turbine, gates for regulating the flow of water through the turbine, fluid pressure operated means to open and close the gates, a source of fluid under pressure, and means operatively connected to the gates and operated by the movements of the gates to apply said pressure to the fluid pressure operated means to open and close the gates and photo-electric cell means controlled by the speed of the turbine adapted to control the application of said fluid pressure means.

2. In a hydraulic turbine, gates for regulating the flow of water through the turbine, a pressure-operated motor to open and close the gates, a source of pressure, electrically operated means to control the application of pressure from the source to the motor, and photo-electric cells controlled by the speed of the turbine to cause the electrically operated means to operate, whereby pressure is applied to the motor to open or close the gates.

3. In a hydraulic turbine, gates to regulate the flow of water through the turbine, light-operated means operatively connected to the gates to open and close them, means to control the application of light to the light-operated means, and means operatively connected to the gates and operated by the movements of the gates to modify the action of the means to control the application of light.

4. In a hydraulic turbine, gates to regulate the flow of water through the turbine, a motor cylinder, a piston in said cylinder connected to the gates to open and close them, a valve cylinder connected by a pipe to each end of the motor cylinder, a source of fluid pressure, a pressure pipe from the source to the valve cylinder, return pipes from the valve cylinder to the source, a valve member in the valve cylinder to control the application of pressure fluid to the motor cylinder and the return of fluid from the motor cylinder, and electrical means responsive to the movement of the turbine for moving the valve.

5. In a hydraulic turbine, gates to regulate the flow of water through the turbine, a motor cylinder, a piston in said cylinder connected to the gates to open and close them, a valve cylinder connected by a pipe to each end of the motor cylinder, a source of fluid pressure, a pressure pipe from the source to the valve cylinder, return pipes from the valve cylinder to the source, a valve member in the valve cylinder to control the application of pressure fluid to the motor cylinder and the return of fluid from the motor cylinder, and electrical means responsive to the movement of the turbine controlled by the speed of the turbine for moving the valve.

6. In a hydraulic turbine, gates to regulate the flow of water through the turbine, a motor cylinder, a piston in said cylinder connected to the gates to open and close them, a valve cylinder connected by a pipe to each end of the motor cylinder, a source of fluid pressure, a pressure pipe from the source to the valve cylinder, return pipes from the valve cylinder to the source, a valve member in the valve cylinder to control the application of pressure fluid to the motor cylinder and the return of fluid from the motor cylinder, and electrical means including photo-electric cells controlled by the speed of rotation of the turbine for moving the valve.

7. In a hydraulic turbine, gates for regulating the flow of water through the turbine, a motor cylinder, a piston in said cylinder connected to the gates to open and close them, a valve cylinder, a pipe connecting one end of said motor cylinder to the valve cylinder, a second pipe connecting the other end of said motor cylinder to the valve cylinder, a valve stem in the valve cylinder, a pair of valve members on the stem normally closing the ends of the pipes, a source of fluid pressure, a pressure pipe from said source to the valve cylinder between the valve members, a return pipe from each end of the valve cylinder to the source of fluid pressure, and light-controlled means for moving the valve stem, whereby fluid pressure may be applied to one end of the motor cylinder and relieved from the other end.

8. In a hydraulic turbine, gates for regulating the flow of water through the turbine, a motor cylinder, a piston in said cylinder connected to the gates to open and close them, a valve cylinder, a pipe connecting one end of said motor cylinder to the valve cylinder, a second pipe connecting the other end of said motor cylinder to the valve cylinder, a valve stem in the valve cylinder, a pair of valve members on the stem normally closing the ends of the pipes, a source of fluid pressure, a pressure pipe from said source to the valve cylinder between the valve members, a return pipe from each end of the valve cylinder to the source of fluid pressure, and means for moving the valve stem whereby fluid pressure may be applied to one end of the motor cylinder and relieved from the other end, said means including an electro magnet.

9. In a hydraulic turbine, gates for regulating the flow of water through the turbine, a motor cylinder, a piston in said cylinder connected to the gates to open and close them, a valve cylinder, a pipe connecting one end of said motor cylinder to the valve cylinder, a second pipe connecting the other end of said motor cylinder to the valve cylinder, a valve stem in the valve cylinder, a pair of valve members on the stem normally closing the ends of the pipes, a source of fluid pressure, a pressure pipe from said source to the valve cylinder between the valve members, a return pipe from each end of the valve cylinder to the source of fluid pressure, and means for moving the valve stem whereby fluid pressure may be applied to one end of the motor cylinder and relieved from the other end, said means including a pair of separately energized electro magnets.

10. In a hydraulic turbine, gates for regulating the flow of water through the turbine, a motor cylinder, a piston in said cylinder connected to the gates to open and close them, a valve cylinder, a pipe connecting one end of said motor cylinder to the valve cylinder, a second pipe connecting the other end of said motor cylinder to the valve cylinder, a valve stem in the valve cylinder, a pair of valve members on the stem normally closing the ends of the pipes, a source of fluid pressure, a pressure pipe from said source to the valve cylinder between the valve members, a return pipe from each end of the valve cylinder to the source of fluid pressure, and means for moving the valve stem whereby fluid pressure may be applied to one end of the motor cylinder and relieved from the other end, said means including an electro magnet and a photo-electric cell for causing the magnet to be energized.

11. In a hydraulic turbine, gates for regulating the flow of water through the turbine, a motor cylinder, a piston in said cylinder connected to the gates to open and close them, a valve cylinder, a pipe connecting one end of said motor cylinder to the valve cylinder, a second pipe connecting the other end of said motor cylinder to the valve cylinder, a valve stem in the valve cylinder, a pair of valve members on the stem normally closing the ends of the pipes, a source of fluid pressure, a pressure pipe from said source to the valve cylinder between the valve members, a return pipe from each end of the valve cylinder to the source of fluid pressure, and means for moving the valve stem whereby fluid pressure may be applied to one end of the motor cylinder and relieved from the other end, said means including a pair of electro magnets and a photo-electric cell for each magnet to cause it to be energized.

12. In a hydraulic turbine, gates to regulate the flow of water through the turbine, a motor cylinder, a piston in said cylinder connected to the gates to open and close them, a valve cylinder, a pipe connecting one end of the motor cylinder to the valve cylinder, a second pipe connecting the other end of the motor cylinder to the valve cylinder, a valve stem in the valve cylinder, a pair of valve members on the stem, means acting on the stem tending to cause the valve members to close the ends of the pipes in the valve cylinder, a source of fluid pressure, a pressure pipe from the source to the valve cylinder between the valve members, a return pipe from each end of the valve cylinder to the source of fluid pressure, and means controlled by the speed of the turbine to move the valve stem and the valve members thereon.

13. In a hydraulic turbine, gates to regulate the flow of water through the turbine, a motor cylinder, a piston in said cylinder connected to the gates to open and close them, a valve cylinder, a pipe connecting one end of the motor cylinder to the valve cylinder, a second pipe connecting the other end of the motor cylinder to the valve cylinder, a valve stem in the valve cylinder, a pair of valve members on the stem, means acting on the stem tending to cause the valve members to close the ends of the pipes in the valve cylinder, a source of fluid pressure, a pressure pipe from the source to the valve cylinder between the valve members, a return pipe from each end of the valve cylinder to the source of fluid pressure, and means controlled by the speed of the turbine to move the valve stem and the valve members thereon, said means including an electric circuit having therein an electro magnet and a photo-electric cell.

14. In a hydraulic turbine, gates for regulating the flow of water through the turbine, a source of fluid under pressure, means for applying fluid pressure to the gates to move them to regulate the speed of the turbine, and photo-electric cell means adapted to control the application of said fluid pressure to the gates.

15. In a hydraulic turbine, gates for regulating the flow of water through the turbine, a fluid pressure operated motor for moving the gates, a source of fluid under pressure, and electrical means responsive to the speed of the turbine for applying said fluid to the motor, and photo-electric cell means adapted to control the application of said fluid pressure to the gates.

16. In a hydraulic turbine, gates for regulating the flow of water through the turbine, a fluid pressure operated motor for moving the gates, a valve member connected to the motor, a source of fluid under pressure connected to the valve member, and electrical means responsive to the speed of the turbine to operate the valve member to admit the fluid to the motor, and photo-electric cell means adapted to control the application of said fluid pressure to the gates.

17. In a hydraulic turbine, gates for regulating the flow of water through the turbine, a fluid pressure operated motor for moving the gates, a valve member connected to the motor, a source of fluid under pressure connected to the valve member, and electrical means responsive to the speed of the turbine to operate the valve member to admit the fluid to the motor, said means including a light responsive member.

GEORGE A. BIGGS.